United States Patent [19]

Turpin

[11] 4,163,094

[45] Jul. 31, 1979

[54] HEAT CURING WATER SOLUBLE HOMOPOLYURETHANES

[75] Inventor: Edward T. Turpin, Elyria, Ohio

[73] Assignee: SCM Corporation, New York, N.Y.

[21] Appl. No.: 894,489

[22] Filed: Apr. 7, 1978

[51] Int. Cl.$^2$ .............................................. C08G 18/80
[52] U.S. Cl. .............................. 528/45; 260/29.2 TN
[58] Field of Search ................... 528/45; 260/29.2 TN

[56] References Cited

U.S. PATENT DOCUMENTS 3,773,729  11/1973  Wakimoto et al. ............. 260/18 TN Primary Examiner—Maurice J. Welsh
Attorney, Agent, or Firm—Thomas M. Schmitz

[57] ABSTRACT

A one-step process for synthesizing water soluble self-curing polyurethanes is achieved by co-reacting certain monomers under controlled conditions to form a blocked, water soluble polyurethane which can be subsequently dispersed in water. The polyurethane polymer is substantially free of high molecular weight hydrocarbon chains and essentially comprises all polyurethane units and is adapted to self-cross link upon being subjected to heat. The polymer is particularly suitable for producing polyurethane protective coatings which exhibit substantially increased film hardness, abrasion resistance, as well as other desirable film integrity properties.

2 Claims, No Drawings

HEAT CURING WATER SOLUBLE HOMOPOLYURETHANES

BACKGROUND OF THE INVENTION

Polyurethane polymers are well known to impart particularly desirable and high quality film integrity properties and are particularly suitable for protective coatings or paint coatings applied to substrates. The most preferred polyurethanes are homopolymer polyurethane polymers consisting essentially of repeating urethane units and such polymers exhibit much improved film properties over modified polyurethanes such as oil-modified air drying polyurethanes or similar polyurethane copolymers. In essence, the polyurethane homopolymer urethane readily exhibits the best film properties but often must be modified in practice with other polymer chain components such as fatty acids or hydrocarbon polymeric chains so as to obtain flexibility and proper adhesion of the film to the substrate. More recently, the need for water soluble polyurethane coatings has been suggested for environmental reasons to avoid organic solvent systems. However, water miscible polyurethane coatings have been difficult to produce as well as deficient in film integrity properties when compared to solvent based polyurethane coatings. Soluble polyurethane coatings often exhibit poor water resistance, poor humidity resistance, poor chemical resistance, and poor abrasion resistance. U.S. Pat. No. 3,773,729 proposes a water soluble polyurethane copolymer primarily based upon an internal nonurethane polymer of a high molecular weight hydrocarbon produced by co-reaction of ethylenic unsaturated monomers wherein the high molecular weight hydrocarbon chain is capped by very minor weight amounts of diisocyanate to form a urethane modified hydrocarbon dispersed in water.

It now has been found that an unmodified water soluble polyurethane homopolymer of urethane polymeric units can be produced by co-reacting a blocked di- or triisocyanate, a polyol containing two or more hydroxyls, a hydroxy-acid material containing at least one reactive hydroxy group and at least one nonreactive carboxy group to form a polyurethane polymer which reacted further with ammonia or an organic amine to solubilize the polyurethane polymer within water. The blocked polyurethane polymer can then be applied to a substrate and cured by heat. The heat cure co-reacts the free hydroxy and the formerly blocked isocyanate group on the polyurethane polymer to form a cured internally cross-linked polymer. The protective coating films thus produced contain a high percentage of urethane linkages (as high as 37% by polymer weight) thereby exhibiting extraordinarily high film hardness and film abrasion resistance as well as excellent chemical and solvent resistance. Excellent stability in water as well as excellent film adhesion to substrates is readily achieved. The polyurethane polymer is very homogeneous consisting essentially of repeating urethane linkages. These and many other advantages are achieved by the heat curable water dispersible polyurethane homopolymer of this invention.

SUMMARY OF THE INVENTION

A water dispersible polyurethane comprising a homopolymer of repeating polymeric urethane units is produced by co-reacting on a weight basis between about 16% and 87% of a di- or triblocked isocyanate, or a partially blocked di- or triisocyanate; 0% and 69% polyol having at least two hydroxyls; 5% and 84% hydroxy-acid having at least one reactive hydroxy and at least one non-reactive carboxyl which is non-reactive to isocyanate during polymer synthesis. Ammonia or organic amines are further reacted with the polyurethane polymer to render the polymer water soluble. The aqueous polyurethane polymer can be applied to a substrate as a film and heat cured to cross-link the hydroxy and formerly blocked isocyanate group.

DETAILS OF THE INVENTION

The aqueous dispersion of the polyurethane of this invention is produced from co-reacting a partially blocked di- or triisocyanate, a polyol, a hydroxy-acid, and ammonia or an organic amine to form a water soluble homopolymer polyurethane.

Referring first to the partially blocked polyisocyanate, the same can be di- or triisocyanate having one or two reactive isocyanate groups and one blocked isocyanate group per isocyanate molecule. The average blocking of the isocyanate can range as high as two isocyanate groups for a triisocyanate although the average can be quite low and only minor amounts as low as 0.05 per isocyanate molecule. The preferred range of blocked isocyanate groups can advantageously be 1 to 1.8 free reactive isocyanate groups and 0.2 to 1 blocked isocyanate groups per diisocyanate; and 1 to 2 free isocyanate groups and 1 to 2 blocked isocyanate groups for a triisocyanate. Premature gelation or polymer stability is overcome by this invention and hence the level of unblocked isocyanate groups need not be minimized. The polyisocyanates can be di- or triisocyanates such as for example 2,4 and 2,6 tolylene diisocyanate, phenylene diisocyanate; hexamethylene or tetramethylene diisocyanate, 1,5 naphthalene diisocyanate, ethylene or propylene diisocyanate, trimethylene or triphenyl or triphenylsulfone triisocyanate, and similar di- or triisocyanates. The polyisocyanate can be generally selected from the group of aliphatic, cyclo-aliphatic and aromatic polyisocyanates such as for example hexamethylene 1,6-diisocyanate, isophorone diisocyanate, diisocyanate, 1,4-dimethyl cyclohexane, diphenylmethane diisocyanate 2,4-tolylene diisocyanate, 2,6-tolylene diisocyanate and mixtures thereof, polymethylene polyphenyl polyisocyanate.

The blocking agent for blocking one of the isocyanate groups on the polyisocyanate are typical blocking agents and can include for example phenols, thiols, tertiary alcohols, secondary aromatic amines, cresols, exylenols, lactams, active methylene compounds, mercaptons, and 1,3 dicarbonyl compounds. Useful blocking agents can include for example phenolic compounds such as phenol, the cresols, the xylenols, etc.; lactams such as e-caprolactam, α-butyro lactam; etc.; active methylene compounds such as diethyl malonate, ethyl aceto-acetate, etc.; alcohols such as isopropyl alcohol, tertiary butyl alcohol, etc.; mercaptans such as butyl mercaptan, thiophenol, etc.; amides such as acetamide, aceto-anilide, etc.; imides such as succimide, phthalimide, etc.; amines such as diphenylamine, aniline, etc.; urea compounds such as urea, thio-urea, etc.; oximes such as formaldoxime, acetoxime, methyl ethyl ketoxime, etc.; preferred blocking agents are taken from the classes of phenols, lactams, active methylene compounds and oximes.

Referring now to the polyol, useful polyols that can be co-reacted with the blocked polyisocyanate in the polymer synthesis process can contain two or more hydroxyl groups. Useful polyols preferably contain two, three, or four hydroxyl groups for co-reaction with the free isocyanate groups on the blocked polyisocyanate. Useful polyols are: -diols such as ethylene glycol, propylene glycols, butylene glycols, neopentyl glycol, 14-cyclohexane dimethanol, hydrogenated bisphenol A, etc.; triols such as glycerol, trimethylol propane, trimethylol ethane; tetrols such as pentaerythritol; hexols such as sorbitol, dipentaerythritol, etc.; polyether polyols produced by the addition of alkylene oxides to polyols; polycaprolactone polyols produced by the addition of monomeric lactones to polyols, such as caprolactone; di-hydroxy ester such as 22-dimethyl-3-hydroxypropyl 22-dimethyl-3-hydroxypropionate commonly known as Esterdiol 204 (supplied by Union Carbide); hydroxy terminated polyesters produced by condensation of any of the above polyols with polybasic acids in such ratio that the final condensate is essentially free from carboxyl acidity and has a molecular weight range up to about 500.

The polyurethane copolymer of this invention further contains a co-reacted hydroxy-acid material. The hydroxy-acid contains at least one reactive hydroxy group for co-reacting with the isocyanate during polymer synthesis and at least one non-reactive carboxy group which is non-reactive to the isocyanate groups during the polymer synthesis. The hydroxy-acid can be represented by the general formula:

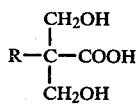

where R is hydrogen, hydroxymethyl or alkyl of up to 20 carbon atoms. Examples of such acids are 2,2-dihydroxymethyl propionic acid, 2,2-dihydroxymethyl butyric acid, glycolic acid, and the like; other acids are clycolic acid, lactic acid, 12-hydroxy stearic acid, the product of the Diels-Alder addition of sorbic acid to di-(2-hydroxyethyl) maleate or fumarate, or low molecular weight (300 to 600) precondensates of polyols with tribasic acids such as trimellitic anhydride or Ricinoleic acid.

Polyurethane polymer produced in accordance with this invention can be dispersed in water by reacting the polymer with organic aliphatic amine or ammonia added in amount sufficient to substantially neutralize the carboxyl acidity present. The selection of the particular amine is ordinarily dictated by the boiling point and presence of active hydrogen, i.e., whether the amine is primary, secondary or tertiary. Generally, if primary or secondary amine is used, the boiling point should not exceed about 150° C. If a tertiary amine is used, the boiling point can be as high as about 250° C. High boiling active hydrogen-bearing amines, however, may not be sufficiently volatile which could prevent displacement of the blocking agent or react preferentially with isocyanate and thus prevent a full cure. Hence, examples of useful primary and secondary amines that can be used are n-butylamine, di-n-butylamine, monoethanolamine, and monopropanolamine. Examples of tertiary amines which can be used are tri-ethylamine, NN-dimethylethanolamine, NN-diethyl-ethanolamine and the like.

A cosolvent can be added to aid in dispersing or solubilizing the polyurethane polymer into water. Any polar solvent which has at least partial miscibility with water can be used, such as the low alcohols and ketones. Preferred cosolvents, however, are of the glycol ether types, such as ethylene glycol monoethyl ether or ethylene glycol monopropyl ether and the like. These glycol ethers are the preferred cosolvents because they have higher boiling points and flash points and generally promote the attainment of smoother detect-free coatings.

In practice, the water soluble polyurethane can be produced by first reacting a polyisocyanate with substantially less than about 0.5 equivalents of a blocking agent per equivalent of isocyanate. The blocking agent can be added gradually to the polyisocyanate dissolved in a non-hydrogen active solvent such as methyl ethyl ketone. This mixture can be agitated over a period of about one to six hours at reaction temperatures of about 60° C. to 100° C. but less than about 120° C. Catalysts such as tertiary amines or organic tin compounds can be used in small amounts if desired.

The partially blocked polyisocyanate is then added to a heated mixture of polyol and dihydroxy-acid dispersed in a non-hydrogen active solvent such as methyl ethyl ketone so as to produce a stirrable reaction mixture. The mixture is heated under agitation to reaction temperatures of about 60° C. to 100° C. but less than 120° C. After the partially blocked polyisocyanate is added, the reaction temperature is held until substantially all of the unblocked isocyanate groups are completely reacted. Complete reaction can be checked by infra-red analysis. The polyisocyanate polyol and the hydroxy-acid are co-reacted to form repeating urethane linkages in an alternating sequence. The polyurethane further contains carboxyl groups from the hydroxy-acid polymer unit and these carboxyl groups can be partially or completely neutralized with an amine or base material to render the polymer soluble in water. The inert ketone solvent can be replaced if desired with a more suitable water miscible solvent such as a hydroxy-ether solvent by fractional distillation and under reduced pressure if necessary so as to maintain the reactant batch temperature less than about 100° C. After the water miscible solvent is added, the polymer is neutralized with amine or base material and then diluted with water as desired to produce a highly stable water dispersed polyurethane.

Upon heat curing the polyurethane homopolymer, the excess free hydroxy groups on the polymer cross-link with the blocked isocyanate groups on the polymer in self-cross-linking reaction to form still another urethane linkage in the cured film polymer structure. The heat curing process at temperatures of at least about 300° F. and usually 300° F. to 400° F. volatilizes the blocking agent thus producing a free isocyanate for cross-linking with the free hydroxyl group. Hence, the blocked isocyanate groups and free hydroxy groups co-react upon heating to form a cross-linked thermoset polyurethane protective film exhibiting excellent hardness, adhesion, abrasion resistance, and chemical resistance as well as other improved polyurethane film integrity properties.

The invention is described in more detail by the following examples which are intended as substantiation of the invention and not as limitations of it. By parts is meant parts by weight.

EXAMPLE 1

Step 1—Partially blocked diisocynate.

To 609 parts of toluene diisocyanate (commercial mixture - 2,4 isomer/2,6 isomer, 80/20 wt. ratio) is slowly added a solution of 113 parts of e-caprolactam in 200 parts methyl ethyl ketone, at a temperature of 80° C. over a period of 30 minutes. The batch is held for an additional 30 minutes at 80°–85° C., at which point analysis for free isocyanate gave a value of 35.1% NCO based on the combined weight of isocyanate and caprolactam.

Step 2—Polyurethane.

The partially blocked diisocyanate product of Step 1 is added step-wise to a stirring mixture of 204 parts 2,2-dimethyl-3-hydroxypropyl 2,2-dimethyl-3-hydroxypropionate (Esterdiol 204), 134 parts trimethylolpropane, 134 parts dimethylol propionic acid and 596 parts methyl ethyl ketone, at a temperature of 80°–85° C. over a period of four hours. This temperature was held for an additional three hours at which point the free isocyanate content, as measured by infra-red analysis, had become almost zero. The calculated non-volatile content at this point was 60%. Ethylene glycol monobutyl ether (597 parts) was added and most of the methyl ethyl ketone was removed by fractional distillation to a maximum batch temperature of 100° C. The final polyurethane solution was characterized as follows:

Acid number of resin solids—47 mg. KOH per gm.
Non-volatile content—60%
Urethane (NH.COO) content—24.7%

This resin was solubilized in water by the following additions based on 50 parts of resin solution:

Dimethyl ethanolamine—2.2 parts
Deionized water—98 parts

The resulting resin solution was clear and consisted of approximately 20% by weight solid resin dispersed in water.

The foregoing clear resin solution was then applied to a zinc phosphate treated steel panel and baked at 400° F. for 15 minutes. The baked coating had a pencil hardness of 5H, a Tabor Abrasion loss of 0.6–0.9 milligrams per 100 cycles using a 1-kilogram load, and was unaffected by immersion for 72 hours in 5% solutions of sulphuric acid or sodium hydroxide, or by rubbing 200 times with a rag soaked with methyl ethyl ketone. When the aqueous resin solution was stored at a temperature of 60° C. for a period of seven days, no visible change had occurred. The resin exhibited the same properties as when freshly prepared indicating excellent hydrolytic and chemical stability.

EXAMPLE 2

Step 1—Partially blocked diisocyanate.

To 770 parts by weight isophorone diisocyanate was added a solution of 113 parts caprolactam and 0.4 parts dibutyl tin dilaurate in 200 parts methyl ethyl ketone, over a period of 30 minutes at 80°–85° C. After an additional hold period of 30 minutes, the NCO content (calculated on the combined weight of the diisocyanate and caprolactam) had dropped to 27.8% (calculated value was 28.5%).

Step 2—Polyurethane.

The product of Step 1 was added step-wise, over a period of five hours, to a stirring refluxing mixture of: polycaprolactone diol 0200 (molecular weight about 530)—520 parts; trimethylolpropane—134 parts; dimethylol propionic acid—134 parts; dibutyl tin dilaurate—1.4 parts; methyl ethyl ketone—920 parts. The free isocyanate content, as determined by infra-red analysis, had dropped to almost zero after an additional four-hour hold period at 80°–85° C. Most of the ketone solvent was removed by distillation and replaced by ethylene glycol monobutyl ether to a final non-volatile content of 64%. The acid number, based on non-volatile content, was 33.5 mg. KOH per gm. The resin was fully neutralized with dimethyl ethanolamine and produced a good, clear solution in water at 20% non-volatile content. The aqueous polyurethane mixture flowed down over a cold-rolled steel panel and was baked at 400° F. for 15 minutes. The bake film gave a hard, tough mar-resistant film comparable to Example 1.

EXAMPLE 3

Step 1—Partially blocked polyisocyanate.

To 346 parts by weight Mondur MRS (Monsanto-polyphenyl polymethylene isocyanate, 31.6% NCO) is added a solution of 67.8 parts caprolactam in 250 parts methyl ethyl ketone, over a period of 60 minutes at 80°–85° C. followed by a hold period of 60 minutes. The theoretical NCO content based on the combined weight of MRS and caprolactam determined by butylamine titration was 21.5%. At the rate of 8 gm. every 30 minutes, a total of 40 grams of dimethylol propionic acid was then added. The batch was then held at 80°–85° C. for an additional 60 minutes.

Step 2—Polyurethane.

The product of Step 1 was added stepwise at 80°–85° C. over a period of eight hours to a stirring mixture of: dipropylene glycol—72.4 parts; dimethylol propionic acid—60.5 parts; and methyl ethyl ketone—141 parts. The reaction mixture was held at 85° C. for an additional two hours. At this point the resin was substantially devoid of any free isocyanate as indicated by infrared analysis. The ketone solvent was almost all removed by distillation and replaced by ethylene glycol monobutyl ether to a non-volatile content of 60%. The final acid number on resin solids was 76 mg. KOH per gram. The calculated urethane (NH.COO) content of the resin was 26.2%.

The foregoing examples illustrate the water dispersed, self-curing polyurethane polymer wherein the polymer is self-curing between available hydroxyl groups and blocked isocyanate groups by exposure to heat curing at temperatures above about 150° C. The homopolymer polyurethane is self-curing and does not require the addition of an aminoplast or other cross-linking agent to cross-link the applied protective film coating. The cured cross-linked polyurethane film of this invention exhibits superior abrasion resistance, excellent solvent resistance, and excellent chemical resistance.

The foregoing examples are illustrative but are not intended to be limiting except by the appended claims.

I claim:

1. In a process for manufacturing a water soluble homopolymer polyurethane being self-curing upon application of heat, comprising the steps of:
copolymerizing on a weight basis (a) 16% to 87% of a partially blocked polyisocyanate containing on an average between 0.05 and 2 equivalents blocked isocyanate groups and between 1 and 2 equivalents of reactive isocyanate groups per molecule of polyisocyanate, (b) 5% to 84% of a low molecular weight dihydroxy-acid containing at least one nonreactive group and at least two reactive hydroxyls and of the general structure

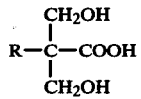

wherein R is a hydrogen, a hydroxymethyl, or an alkyl having up to 20 carbon atoms, and the hydroxyl groups being reactive to copolymerize with the reactive isocyanate groups on said polyisocyanate to provide repeating urethane linkages, and (c) 0% to 69% of a polyol selected from diols and triols, having a molecular weight less than 500, said polyols having at least two reactive hydroxyls for copolymerizing with the reactive isocyanate groups on said polyisocyanate to provide repeating urethane linkages, said dihydroxy-acid (b) and said polyol (c) collectively containing at least about 2.5% excess equivalents of reactive hydroxyls relative equivalents of reactive isocyanate groups on said polyisocyanate (a) to completely react available reactive isocyanate groups into urethane linkages, said polyisocyanate (a) and said dihydroxy-acid (b) and said polyol (c) being copolymerized at temperatures between about 50° C. and 100° C. to form a homopolymer polyurethane containing repeating urethane linkages and having blocked isocyanate groups, unreacted hydroxyl groups and unreacted carboxyl groups;

neutralizing the unreacted carboxyl groups on said homopolymer polyurethane with a base and solubilizing said homopolymer polyurethane in water to provide a stabilized aqueous polyurethane mixture;

coating a substrate with a film of said aqueous polyurethane mixture; and heating the film at temperatures above about 150° C. for time sufficient to heat cure the film by cross-linking the blocked isocyanate groups with the unreacted hydroxyl groups of said homopolymer polyurethane.

2. The process in claim 1 wherein said homopolymer polyurethane is neutralized with a base selected from ammonia or an organic amine.

* * * * *